(12) United States Patent
Park et al.

(10) Patent No.: US 11,134,020 B1
(45) Date of Patent: Sep. 28, 2021

(54) FLOW CONTROL OF TWO TCP STREAMS BETWEEN THREE NETWORK NODES

(71) Applicant: MORGAN STANLEY SERVICES GROUP INC., New York, NY (US)

(72) Inventors: Yousin Park, Manhasset, NY (US); Zhiqin Wang, Jersey City, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/850,915

(22) Filed: Apr. 16, 2020

(51) Int. Cl.
| | | |
|---|---|---|
| *H04L 12/835* | (2013.01) | |
| *H04L 12/935* | (2013.01) | |
| *H04L 12/801* | (2013.01) | |
| *H04L 12/815* | (2013.01) | |
| *H04L 12/807* | (2013.01) | |

(52) U.S. Cl.
CPC .............. *H04L 47/30* (2013.01); *H04L 47/18* (2013.01); *H04L 47/193* (2013.01); *H04L 47/225* (2013.01); *H04L 47/27* (2013.01); *H04L 49/3063* (2013.01)

(58) Field of Classification Search
None
See application file for complete search history.

(56) References Cited

U.S. PATENT DOCUMENTS

| | | | | |
|---|---|---|---|---|
| 6,874,106 B2 * | 3/2005 | Suzuyama | .......... | H04L 29/1215 709/224 |
| 7,012,900 B1 * | 3/2006 | Riddle | ................ | H04L 41/5032 370/252 |
| 7,042,907 B2 * | 5/2006 | Matsunaga | .............. | H04L 29/06 370/389 |
| 9,560,172 B2 * | 1/2017 | van Bemmel | .......... | H04L 69/22 |
| 2004/0165538 A1 * | 8/2004 | Swami | ................ | H04L 12/5602 370/252 |
| 2005/0058131 A1 * | 3/2005 | Samuels | ................. | H04L 41/00 370/389 |
| 2008/0107124 A1 * | 5/2008 | Ros-Giralt | .............. | H04L 45/24 370/401 |
| 2010/0135166 A1 * | 6/2010 | Ahluwalia | .............. | H04L 47/14 370/252 |
| 2011/0149793 A1 * | 6/2011 | Kim | ....................... | H04L 43/026 370/253 |

(Continued)

*Primary Examiner* — Eunsook Choi
(74) *Attorney, Agent, or Firm* — Weitzman Law Offices, LLC

(57) ABSTRACT

A system for forwarding packets between a first endpoint and a second endpoint, comprising one or more processors; a first network interface for communication with the first endpoint and a second network interface for communication with the second endpoint; and non-transitory memory comprising instructions. The instructions cause the one or more processors to receive a first packet from the first endpoint comprising a first data payload; generate a second packet, comprising the first data payload and an indicator of remaining buffer capacity different from an actual buffer capacity of the system; transmit the second packet to the second endpoint; receive a third packet from the second endpoint comprising a second data payload; generate a fourth packet, comprising the second data payload and an indicator of remaining buffer capacity different from an actual buffer capacity of the system; and transmit the fourth packet to the first endpoint.

20 Claims, 5 Drawing Sheets

(56) References Cited

U.S. PATENT DOCUMENTS

| | | | |
|---|---|---|---|
| 2011/0299554 A1* | 12/2011 | Ros-Giralt | H04L 29/12537 370/469 |
| 2014/0286258 A1* | 9/2014 | Chowdhury | H04L 47/40 370/329 |
| 2016/0191398 A1* | 6/2016 | Okada | H04L 1/1854 370/229 |
| 2018/0324100 A1 | 11/2018 | Retnamony et al. | |
| 2020/0110625 A1* | 4/2020 | Warnicke | G06F 9/5077 |

* cited by examiner

FLOW CONTROL OF TWO TCP STREAMS BETWEEN THREE NETWORK NODES

FIELD OF INVENTION

Tis application relates to systems and methods for a router to use in managing a bi-directional flow of TCP packets between two network endpoints.

BACKGROUND

In the Transmission Control Protocol/Internet Protocol (TCP/IP), a connection between two endpoints is established by a "handshake" and acknowledgment process before dividing up a message into a series of discrete packets to be transmitted through the network and reassembled at the other endpoint.

Because nodes of the network (such as routers or the endpoints themselves) may receive packets faster than the packets can be processed, each receiving node must keep a cache of unprocessed packets. Preferably, the receiving node should also, when acknowledging receipt of a packet, include in its response to the transmitting node a measure of cache space remaining. Then, the transmitting node can pause transmission if it knows there is unlikely to be space in the cache and that the receiving node will be forced to drop the packet and the transmitting node will waste network resources with re-transmission of the packet when the receiving node fails to acknowledge receipt.

In some ultra-low latency systems, latency must be kept to mere nanoseconds or less between transmission of a packet and receipt by the destination, or else the data within the packet may be "stale," non-responsive to new developments, or otherwise unsuitable for use. Any dropped packets due to insufficient buffer space create an absolutely unacceptable network state, since the transmitter will not have time to determine that a message failed to send and follow up with a second message during the period before the message's usefulness is already gone.

Thus, there is a need for a network router capable of smoothing TCP flows while providing an ultra-low latency network experience to each endpoint of the TCP connection.

SUMMARY OF THE INVENTION

A system for forwarding packets between a first endpoint and a second endpoint is disclosed. The system comprises one or more processors, one or more network interfaces for communication with the first endpoint and with the second endpoint; and non-transitory memory. The non-transitory memory comprising instructions that, when executed by the one or more processors, cause the one or more processors to: receive a first packet from the first endpoint comprising a first data payload; generate a second packet, comprising the first data payload and an indicator of remaining buffer capacity different from an actual buffer capacity of the system; transmit the second packet to the second endpoint; receive a third packet from the second endpoint comprising a second data payload; generate a fourth packet, comprising the second data payload and an indicator of remaining buffer capacity different from an actual buffer capacity of the system; and transmit the fourth packet to the first endpoint.

A computer implemented method for forwarding packets between a first endpoint and a second endpoint is also disclosed. The method comprises receiving a first packet from a first endpoint comprising a first data payload; generating a second packet comprising the first data payload and an indicator of remaining buffer capacity different from an actual buffer capacity of the system; transmitting the second packet to a second endpoint; receiving a third packet from the second endpoint comprising a second data payload; generating a fourth packet comprising the second data payload and an indicator of remaining buffer capacity different from an actual buffer capacity of the system; and transmitting the fourth packet to the first endpoint.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

DETAILED DESCRIPTION

In order to address the issues described above, a packet router is described below wherein packets are forwarded while also being modified to signal to the endpoints that cache capacity may not be as great as would otherwise be thought, as will be described further below.

Figure 1:
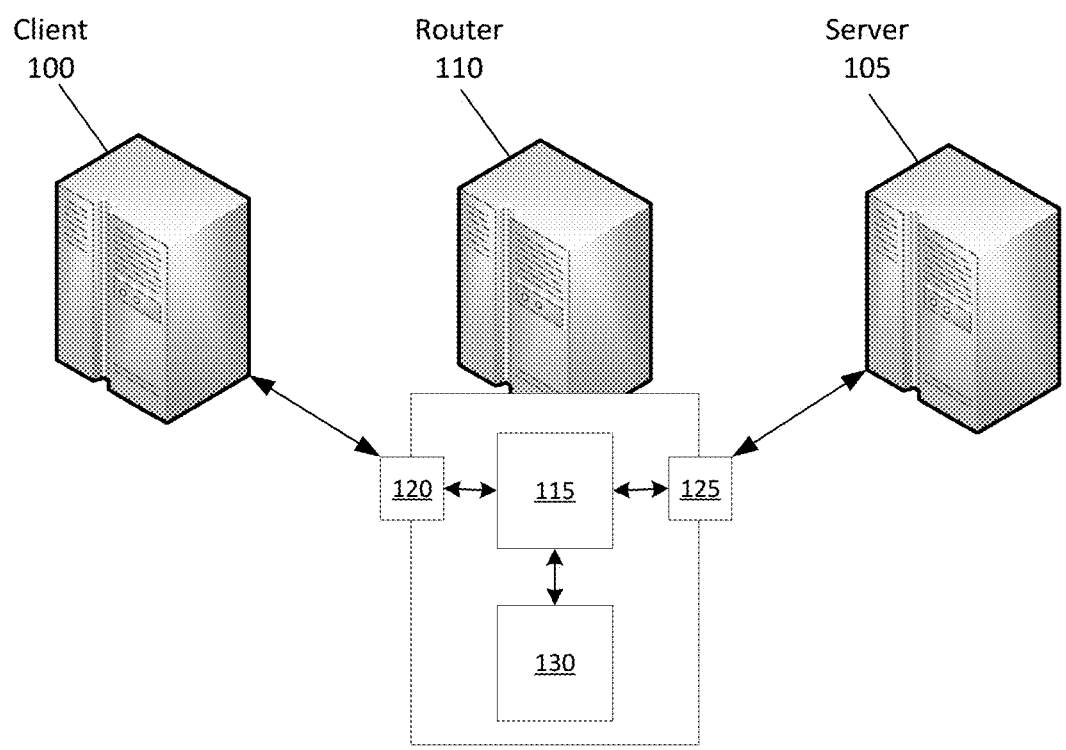
FIG. 1 depicts a network of computing devices communicating with one another using the TCP/IP protocol according to methods disclosed herein.

FIG. 1 depicts a network of computing devices communicating with one another using the TCP/IP protocol.

Two network endpoints, a client 100 and a server 105, are connected by a network using the TCP/IP protocol. Between them, a router 110 acts as an intermediary to forward messages and replies between the client 100 and the server 105 while doing minimal filtering and processing of the data within the messages.

For example, router 110 could be a firewall that tracks numbers of incoming messages to server 105 and forwards them to the server 105 if and only if they are not so numerous that they indicate a possible denial of service attack. Router 110 could be a gateway to a content delivery network that forwards a request for content if and only if the requester is a subscriber to a particular service. Router 110 could be a facilitator of stock trades that does basic sanity checking on a trade order and forwards a trade order to a stock exchange only if the checks are met. The nature of the processing is not relevant to the method below, except in the respect that a system may need to intercept transmitted packets and send modified packets, while trying to keep network latency to an absolute minimum for peak network performance.

In a preferred embodiment, router 110 accomplishes the processing using a field programmable gate array (FPGA) 115 to perform a large number of possible filtering and processing tasks simultaneously in parallel by various modules. For example, one module of the FPGA 115 may check that the client 100 has authorization to perform a request in the data payload of the packet, while another checks that the magnitude of a number within the request is within a predetermined acceptable range, while a third checks that the request conforms to an expected syntax, and so on. In some embodiments, there may be dozens or even hundreds of modules processing the contents of a packet in parallel and forwarding the packet to the server 105 if and only if the packet passes every check.

The FPGA 115 may also modify certain elements of the packet, as described further below in the descriptions of FIGS. 2-4.

After a first interface 120 has received a packet from the client 100 and the contents of the packet have been checked and either approved for re-transmission or modified by the elements of the FPGA 115, a new data packet is generated for transmission out via second interface 125 to the server 105.

Although the embodiments described herein focus on an asymmetric communications system—where a client 100 actively initiates communications and originates requests, and the server 105 passively awaits communications and exclusively performs the requests and acknowledges them—the system and methods described herein can apply equally well to symmetric communications between two peer systems in a network, where the devices 100 and 105 each take turns acting as a client and as a server, alternating as context may require, or otherwise make various transmissions without necessarily responding to a previous communication.

In some embodiments, a second processor 130, which may or may not be an FPGA or a more general purpose processor, is also incorporated into the router 110. The second processor 130 may be used to do further, time-intensive processing that is not needed before re-transmission of a packet, and which is not time-critical. For example, the second processor 130 may be used to archive packets in a database for later retrieval, querying, or aggregation for record-keeping.

Although a system is described here in which a single router 110 performs a number of functions, other configurations are possible in which functions are divided among multiple devices. However, such configurations would not be preferred, as they would inevitably increase latency beyond the needs of an ultra-low latency application.

Figure 2:
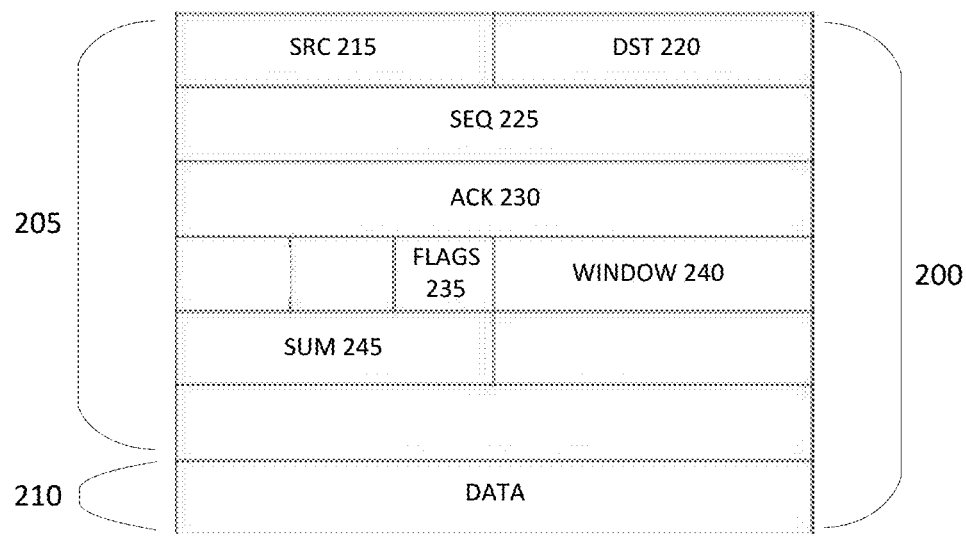
FIG. 2 depicts the header and payload of a typical TCP packet as used by methods disclosed herein.

FIG. 2 depicts the header and payload of a typical TCP packet as used by methods disclosed herein.

Every TCP packet 200 has a header 205 and can have a payload 210. There are five key portions of the header relevant to the methods described herein: a source port 215, a destination port 220, a sequence value 225, an acknowledgment value 230, various flags 235, a window value 240, and a checksum 245.

The router 110 may set up a complete information barrier between the client 100 and the server 105, such that neither knows the exact configuration of the other and only interfaces with the router 110. As a result, packets received by the router 110 from the client 100 that the client directs to a particular port 220 may need to go to an entirely different port of the server 105, and similarly the router 110 may need to indicate a different source port 215 to which the server 105 should respond, compared to the port of the client 100 that originated the packet.

The sequence value 225 preferably begins at 0 when a new connection is established, but can be any arbitrary number in TCP. It indicates the number of the last byte (or window unit, if window scaling is in effect) transmitted by a network endpoint and increments as data payloads 210 are sent. Similarly, the acknowledgment value 230 indicates the identifier of the last byte or window unit received by a network endpoint.

The flags 235 include bits to indicate particular packet types that may be relevant as described further below in discussion of FIGS. 3 and 4, including that a packet is a SYN packet, an ACK packet, has flags for both (is a SYNACK packet, as described further below), or is a FIN packet.

The window value 240 indicates a number of bytes (or window units) that the sender has buffer capacity to receive without dropping a packet. The discussion of FIG. 4, below, describes how window values may be manipulated to smooth network flow between the client 100 and server 105.

Checksum 245 stores a value related to other aspects of the packet header such that, if one or more other values of the header 205 are corrupted, a checksum computed based on the corrupted values will not match the checksum 245 and the packet will be discarded as spurious and in need of re-sending. As a result, any method manipulating other header values of a received packet before sending a modified packet may need to update the checksum 245 accordingly.

Figure 3:
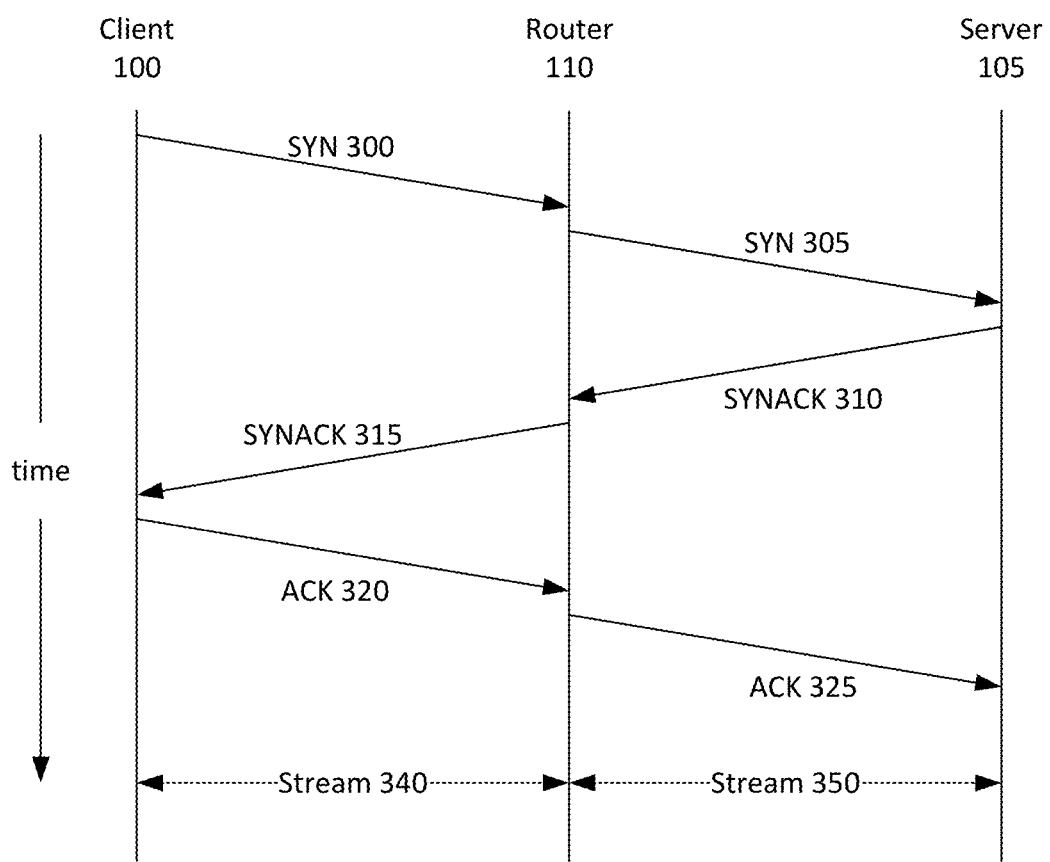
FIG. 3 depicts, in simplified form, TCP handshakes needed to establish two connection streams before transmitting a packet from a first endpoint to a second endpoint.

FIG. 3 depicts, in simplified form, TCP handshakes needed to establish two connection streams before transmitting a packet from a first endpoint to a second endpoint.

When establishing a two-stream connection (streams 340 and 350) between a client 100 and a server 105 using the router 110, a synchronize (SYN) packet 300 from the client 100 must be repeated by the router 110 as packet 305. When the server 105 responds, its synchronization/acknowledgment (SYNACK) packet 310 is repeated by the router 110 as a packet 315 to the client 100. Finally, the client 100 sends an acknowledgment (ACK) packet 320 to the router 110 that is repeated as packet 325 to server 105.

Although the overall structure is functionally similar to the single stream that would be established if router 110 blindly forwarded packets between client 100 and server 105 without modification, two independent streams 340 and 350 have been created, one consisting of a handshake made by three packets 300, 315, and 320, and the other consisting of a handshake made by the remaining three packets 305, 310, and 325. The client 100 is essentially agnostic regarding the ports, windows, and sequence and acknowledgement numbers used between the router 110 and the server 105, and the server 105 is essentially agnostic regarding the ports, windows, and sequence and acknowledgement numbers used between the router 110 and the client 100.

Figure 4:
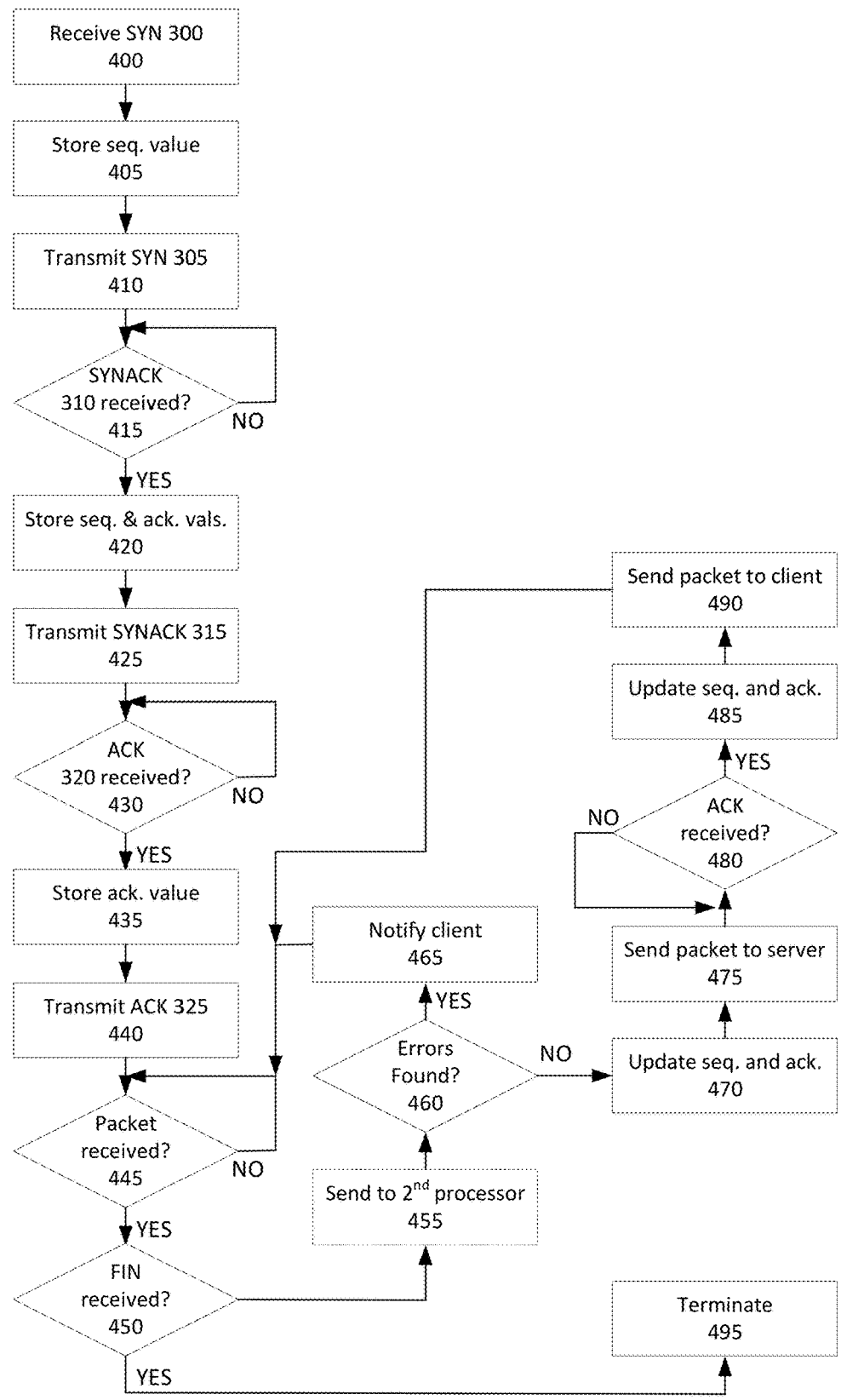
FIG. 4 depicts a method of receiving and retransmitting packets with a modified window size.

FIG. 4 depicts a method of receiving and retransmitting packets with a modified window size.

Initially, the router 110 receives a SYN packet 300 from the client 100 (Step 400) to establish a connection with the server 105.

The sequence value 225 of packet 300 (regarding the sequence of stream 340) is stored for future use (Step 405). Since TCP does not require that sequence values begin at zero, sequence values primarily have meaning as a relative offset with the initial sequence value, showing how many bytes or window units the sender has transmitted. Similarly, acknowledgment values, which track the sequence values, primarily demonstrate (when there is a difference from the sequence value) the amount of data transmitted and not yet acknowledged.

A new SYN packet 305 is generated and transmitted to the server 105 (Step 410). The router begins to wait, determining whether a SYNACK packet 310 has been received (Step 415).

Once the SYNACK packet 310 is received from the server 105, the sequence value 225 and acknowledgment value 230 of the response (i.e., regarding stream 350) are stored (Step 420).

A new SYNACK packet 315 is generated and transmitted to the client 100 (Step 425). The router waits again, determining whether an ACK packet 320 has been received (Step 430).

Once the ACK packet 320 is received, its acknowledgment value 230 is stored (Step 435). Thus, both the initial and current sequence values and acknowledgement values are stored for each of two streams: the stream 340 between client 100 and router 110, and the stream 350 between the router 110 and the server 105.

A new ACK packet 325 is generated and transmitted to the server 105 (Step 440).

Next, the router enters a cycle of waiting for any substantive data packet to be received from the client 100 (Step 445).

When a packet is received, it is first determined whether it is a FIN packet (Step 450). If it is, this indicates the end of the TCP connection, and as a result the connection is terminated (Step 495) and the system returns to waiting for a new TCP connection to be established.

If the received packet is not a FIN packet, it is preferably forward to the second processor 130 for storage and/or analysis (Step 455).

Meanwhile, the modules of FPGA 120 simultaneously check in parallel whether various aspects of the packet's payload are erroneous or unacceptable with respect to the data the server 105 will be expecting and authorized to act upon (Step 460).

If the packet does not pass at least one of the error checks, the client 100 is notified (Step 465), no packet is sent, and the system returns to waiting for a new data packet (back to Step 445).

If the packet does pass the check, the latest client sequence and acknowledgment numbers for stream 340 are updated based on the packet header (Step 470), and a new packet is generated by the router 110 in order to transmit it to the server 105 (Step 475).

When the packet is generated, rather than using the window value that would normally be used by the router 110, the window value reported to the server 105 is calculated as New window=Client-reported window
−(current seq. value to client−initial seq. value to client)
+(current ack. value from server−initial ack. value from server).

That is, the window that is reported by the router 110 to the server 105—the amount of data that router 110 is claiming that it can handle without dropping a packet—is the same as the client 100 has recently indicated it can actually handle, modified to subtract the total size of all packets that are currently in transit, sent by the server 105 and not yet formally acknowledged by the client 100. As a result, even if the client becomes unable to process any further packets, the client is guaranteed to have enough buffer to handle all packets transmitted thus far and which the client is not necessarily aware of, plus the newly reported window's worth of additional packets on top of them.

After sending, the router 110 waits for an ACK packet to be received (Step 480).

When the packet is received, the current sequence and acknowledgment values from the server for the stream 350 are updated (Step 485), and a new packet is generated by the router 110 in order to transmit it to the client 100 (Step 490).

As above, rather than using the window value that would normally be used by the router 110, the window value reported to the client 100 is calculated as New window=Server-reported window
−(current seq. value to server−initial seq. value to server)
+(current ack. value from client−initial ack. value from client).

That is, the window that is reported by the router 110 to the client 100 is the same as the server 105 has recently indicated it can actually handle, modified to subtract the total size of all packets that are currently in transit, sent by the server 105 and not yet formally acknowledged by the client 100. As a result, even if the server becomes unable to process any further packets, the client is guaranteed to have enough buffer to handle all packets transmitted thus far and which the server is not necessarily aware of, plus the newly reported window's worth of additional packets on top of them.

After reporting the ACK packet to the client 105, the router 110 returns to waiting for a new data packet from the client 100 (back to Step 445).

In some embodiments, the FPGA 120 may generate all the packets for maximum speed. In other embodiments, software running on the second processor 130 may generate the ACK packets. This may be a preferable configuration when the need for low latency is largely unidirectional—for example, if a command from the client 100 to the server 105 must be delivered within one nanosecond, but the acknowledgement of the command by server 105 can wait for a millisecond without harm, and only needs to arrive quickly enough that the client 100 does not conclude that the packet has been dropped and attempt to resend it.

Although all of the above description has been directed to the specific context of two TCP streams established between three points, nothing inherently ties the method to the use of the TCP protocol; it is merely particularly convenient to have a protocol that promises to conserve packets and provides a way for nodes of the network to signal their buffer capacity. Other protocols exist or can be imagined in which buffer capacity is reported instead in the payload of a non-TCP packet and all other aspects above are similarly modified in order to operate smoothly within the confines of a different protocol.

Figure 5:
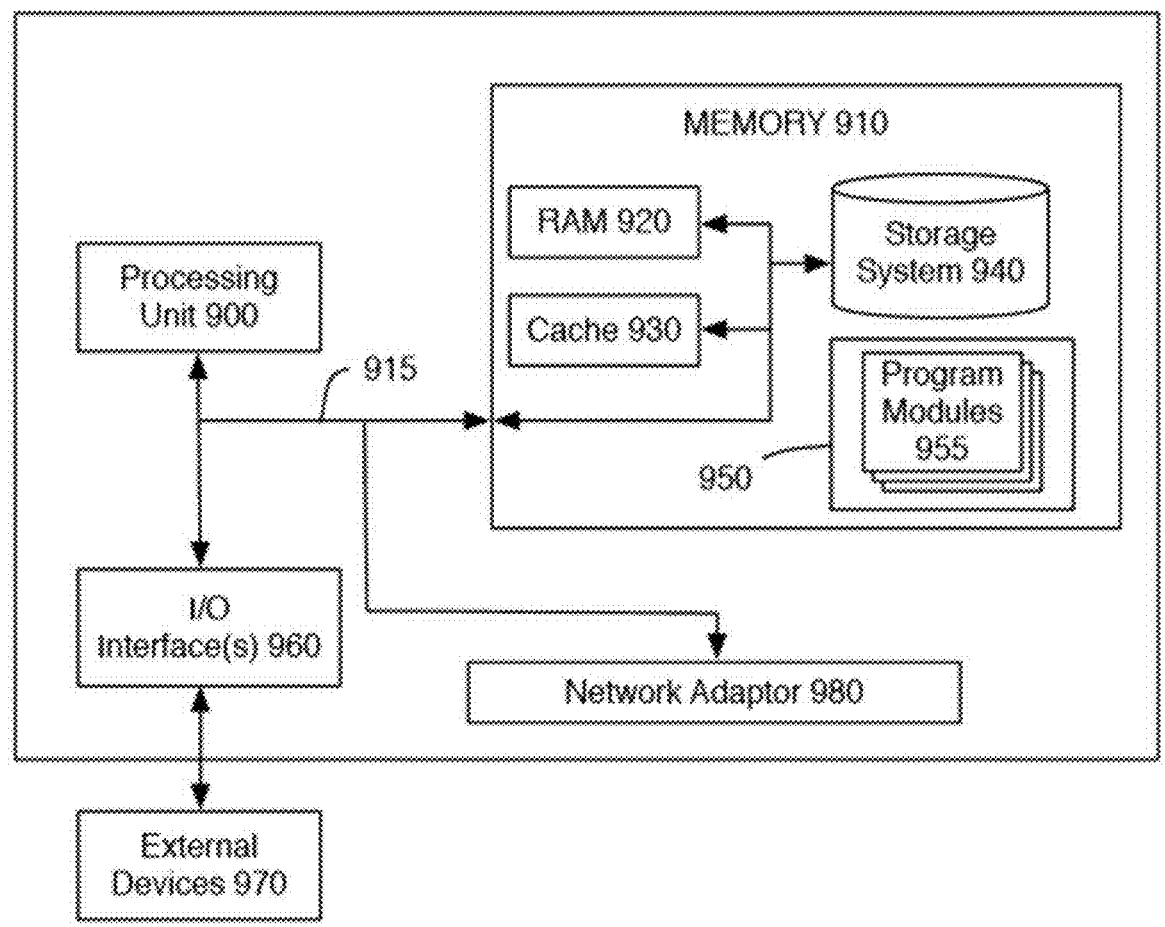
FIG. 5 is a high-level block diagram of a representative computing device that may be utilized to implement various features and processes described herein.

Although FIG. 1 depicts a preferred form of computing device for accomplishing the software-implemented methods described above, those methods do not inherently rely on the use of any particular specialized computing devices, as opposed to standard desktop computers and/or web servers. For the purpose of illustrating possible such computing devices, FIG. 5 is a high-level block diagram of a representative computing device that may be utilized as router 110 to implement various features and processes described herein. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 5, the components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for managing a flow of network packets between a first endpoint and a second endpoint, comprising:
   one or more processors;
   one or more network interfaces for communication with the first endpoint and with the second endpoint; and
   non-transitory memory comprising instructions that, when executed by the one or more processors, cause the one or more processors to:
   receive a first packet from the first endpoint comprising a first data payload;
   generate a second packet, comprising the first data payload and an indicator of remaining buffer capacity different from an actual buffer capacity of the system;
   transmit the second packet to the second endpoint;
   receive a third packet from the second endpoint comprising a second data payload;
   generate a fourth packet, comprising the second data payload and an indicator of remaining buffer capacity different from an actual buffer capacity of the system; and
   transmit the fourth packet to the first endpoint.

2. The system of claim 1, wherein the first, second, third, and fourth packets are sent using the transmission control protocol (TCP).

3. The system of claim 2, wherein indication of remaining buffer capacity is accomplished by setting a window value in TCP headers of the packets.

4. The system of claim 3, wherein the value of a window in the second packet is determined based at least in part on a window in the first packet, and wherein the value of a window in the fourth packet is determined based at least in part on a window in the third packet.

5. The system of claim 4, wherein the windows in the second packet and in the fourth packet are further based on a determination of an amount of data currently in transit and not yet acknowledged by the first or second endpoints.

6. The system of claim 1, wherein the one or more processors comprise a field-programmable gate array (FPGA), and wherein contents of the first packet are analyzed in parallel by multiple modules of the FPGA prior to generation and transmission of the second packet, and the second packet is generated and transmitted by the FPGA.

7. The system of claim 6, wherein, in response to the FPGA determining that a packet from the first endpoint has or lacks a predetermined quality, the system does not transmit a corresponding packet to the second endpoint.

8. The system of claim 6, wherein the one or more processors comprise both the FPGA and a second processor, and wherein the FPGA forwards a copy of the first packet to the second processor.

9. The system of claim 8, wherein the second processor generates an acknowledgment to the fourth packet for transmission to the second endpoint.

10. The system of claim 9, wherein the FPGA overwrites a portion of the acknowledgment and subsequently transmits the acknowledgment to the second endpoint.

11. A computer implemented method, comprising:
receiving a first packet from a first endpoint comprising a first data payload;
generating a second packet comprising the first data payload and an indicator of remaining buffer capacity different from an actual buffer capacity of the system;
transmitting the second packet to a second endpoint;
receiving a third packet from the second endpoint comprising a second data payload;
generating a fourth packet comprising the second data payload and an indicator of remaining buffer capacity different from an actual buffer capacity of the system; and
transmitting the fourth packet to the first endpoint.

12. The method of claim 11, wherein the first, second, third, and fourth packets are sent using TCP.

13. The method of claim 12, wherein indication of remaining buffer capacity is accomplished by setting a window value in TCP headers of the packets.

14. The method of claim 13, wherein the value of a window in the second packet is determined based at least in part on a window in the first packet, and wherein the value of a window in the fourth packet is determined based at least in part on a window in the third packet.

15. The method of claim 4, wherein the windows in the second packet and in the fourth packet are further based on a determination of an amount of data currently in transit and not yet acknowledged by the first or second endpoints.

16. The method of claim 11, wherein contents of the first packet are analyzed in parallel by multiple modules of an FPGA prior to generation and transmission of the second packet, and the second packet is generated and transmitted by the FPGA.

17. The method of claim 16, wherein, in response to the FPGA determining that a packet from the first endpoint has or lacks a predetermined quality, no corresponding packet is transmitted to the second endpoint.

18. The method of claim 16, further comprising: forwarding, by the FPGA, a copy of the first packet to a second processor.

19. The method of claim 18, further comprising:
generating, by the second processor, an acknowledgment to the fourth packet and
transmitting the acknowledgment to the second endpoint.

20. The method of claim 19, wherein the FPGA overwrites a portion of the acknowledgment and subsequently transmits the acknowledgment to the second endpoint.

\* \* \* \* \*